United States Patent [19]

Miyazawa et al.

[11] Patent Number: 5,678,082
[45] Date of Patent: Oct. 14, 1997

[54] ELECTRICAL SYSTEM APPARATUS INCLUDING ONE-CHIP MICROCOMPUTER

[75] Inventors: Azuma Miyazawa, Mitaka; Atsushi Maruyama, Sagamihara; Toshiaki Ishimaru, Hino, all of Japan

[73] Assignee: Olympus Optical Co., Ltd., Tokyo, Japan

[21] Appl. No.: 568,227

[22] Filed: Dec. 6, 1995

[30] Foreign Application Priority Data

Dec. 9, 1994 [JP] Japan .................. 6-305922

[51] Int. Cl.$^6$ .............. G03B 17/00; G06F 12/00; G06F 13/00
[52] U.S. Cl. .............. 396/300; 395/479; 364/238.4; 364/246
[58] Field of Search ............... 354/412, 289.12; 396/300; 364/238.4, 243.3, 243.7, 246, 254.3, 957.1, 964.1, 964.6; 395/479

[56] References Cited

U.S. PATENT DOCUMENTS

| | | | |
|---|---|---|---|
| 4,853,733 | 8/1989 | Watanabe et al. | 354/412 |
| 5,502,830 | 3/1996 | Aihara | 354/289.12 X |

FOREIGN PATENT DOCUMENTS

| | | |
|---|---|---|
| 2-47638 | 2/1990 | Japan . |
| 6-332691 | 12/1994 | Japan . |

*Primary Examiner*—W. B. Perkey
*Attorney, Agent, or Firm*—Frishauf, Holtz, Goodman, Langer & Chick

[57] ABSTRACT

An electrical system apparatus is constructed as follows to easily attain the desired adjustment, repair and change for the version of a stored program on the user side even if a microcomputer containing a rewritable or unrewritable memory is used. That is, the electrical system apparatus includes a one-chip microcomputer containing a memory which is divided into a plurality of blocks and includes one specified block n set in a preset block of the memory for storing a control program for realizing a preset function or specification of the system apparatus, a specified block rewriting program stored in at lest one of the blocks 1 to (n−1) other than the specified block to rewrite the content of the specified block, and a communicating section accessible to the memory and having a serial communicating function, and the rewriting program permits data transmitted from an external device and received by the communicating section to be written into the specified block n.

17 Claims, 11 Drawing Sheets

| VERSION / TYPE | FLASH MEMORY | MASK ROM |
|---|---|---|
| OLD ↕ | F 1 | M 1 |
| | F 2 | M 2 |
| | F 3 | M 3 |
| | ⋮ | ⋮ |
| ↕ NEW | ⋮ | ⋮ |
| | F m | M m |

| M | MODE CHANGEOVER |
|---|---|
| 0 | AUTO-STROBOSCOPE |
| 1 | STROBOSCOPE OFF |
| 2 | SELF-TIMER |
| 3 | RED-EYE SUPPRESSION |

F I G. 13B

ELECTRICAL SYSTEM APPARATUS INCLUDING ONE-CHIP MICROCOMPUTER

BACKGROUND OF THE INVENTION

1. Field of the Invention

This invention relates to an electrical system apparatus utilizing a one-chip microcomputer including a rewritable memory.

2. Description of the Related Art

In recent years, in a camera which is, for example, one type of electronic device or microcomputer device, a microcomputer including a flash memory or ROM tends to be used, and in some cases, the user changes or updates the content of the program of the built-in microcomputer in order to repair and adjust the camera.

For example, in Jpn. Pat. Appln. KOKAI Publication No. 2-47638, a case wherein the setting order of the mode switching of the camera and omission of the mode setting thereof can be set in the EEPROM is disclosed. That is, the camera in which the user can freely change the content of the EEPROM set at the time of production of the camera device based on the requirement caused after the purchase of the camera is disclosed.

Further, there may occur a possibility that the type of the built-in microcomputer used in the early stages of production of the camera device must be changed at the time of repair or the like for some reasons caused later.

In U.S. patent application Ser. No. 247071 (corresponding to Jpn. Pat. Appln. No. 5-121079 and Jpn. Pat. Appln. KOKAI Publication No. 6-332691), a system device having circuit version storing means for storing information relating to the version of a circuit incorporated into a device in a built-in non-volatile memory is disclosed.

SUMMARY OF THE INVENTION

In the above-described conventional system, since the operation content of the system is already fixedly stored as a program in the ROM of the camera, a problem that the program content can be changed only within a previously expected range for the program occurs.

Basically, since all of the programs stored in the flash memory can be randomly rewritten, any change required after the production can be made. However, it takes a long time to rewrite all of the stored programs. Further, there occurs a problem that the reliability of data stored in the memory will be lowered if the entire area of the memory is rewritten.

Further, there occurs a problem that the versions of the microcomputer having a program written in a rewritable memory such as a flash memory and the microcomputer having a program previously written in an unrewritable memory such as a ROM cannot be distinguished from each other. Therefore, these above problems should be solved.

(Object)

An object of this invention is to provide such an electrical system apparatus as to be easily attain the desired adjustment or change for the software program by rewriting a part of the flash memory.

In other words, the object is to provide an electrical system apparatus constructed to easily attain the desired adjustment, repair and change for the software version of the stored program on the user side even if a microcomputer including a rewritable memory such as a flash memory whose content can be rewritten at the time of adjustment or repair and a microcomputer including an unrewritable type memory such as a ROM are provided in the devices of the same type.

In order to solve the above problems and attain the above object, the following measure is taken in this invention.

The measure is to attain the above object by using a one-chip microcomputer containing memory means divided into a plurality of blocks and rewriting only the content of a specified block or blocks of the memory means. Or after checking whether the memory is a rewritable memory or not based on the version of a built-in CPU, and rewriting only the content of a specified block or blocks of the memory means.

More specifically, an electrical system apparatus of this invention including a one-chip microcomputer comprises one specified block set in a preset block in the memory means, for storing the procedure for realizing a preset function or specification of the system apparatus as a program; a specified block rewriting program stored in at least one of the blocks other than the specified block, for rewriting the content of the specified block; and serial communication means accessibly connected to the memory means and having a preset serial communication function; and is characterized in that the specified block rewriting program causes data received by the serial communication means to be written into the specified block; and also characterized in that the electrical system apparatus having a one-chip microcomputer storing a version data that is distinguishable between rewritable memory and ROM.

In order to attain the above object, the electrical system apparatus of this invention comprises as follows.

[1] In accordance with one form of the invention, the electrical system apparatus includes a one-chip microcomputer having memory means divided into a plurality of blocks; wherein at least one specified block set in a preset block in the memory means is used for storing the procedure for realizing a preset function or specification of the system apparatus as a program; a specified block rewriting program stored in at least one of the blocks other than the specified block, for rewriting the content of the specified block; and serial communication means accessibly connected to the memory means and having a preset serial communication function; wherein the apparatus is characterized in that the specified block rewriting program causes data received by the serial communication means to be written into the specified block.

[2] In accordance with another form of the invention, the electrical system apparatus includes a one-chip microcomputer in which the memory means is a rewritable flash memory and the specified block stores a main routine of the control program for defining the function or specification of the system apparatus.

[3] In accordance with another form of the invention, the electrical system apparatus includes a one-chip microcomputer according to [1], wherein memory means contains data indicating the version of ROM or electrically rewritable memory.

(Operation)

With the above construction, the electrical system apparatus of this invention effects the following operation.

That is, since the built-in rewritable memory is divided into a plurality of blocks and has a specified block rewriting program stored in the other block to rewrite the content of the specified block, it is possible to receive data containing a program transferred from an external device via the serial communication means and rewrite only the content of the specified block according to the rewriting program, and therefore, it becomes possible to easily attain the adjustment, repair and change without rewriting the entire area of the memory space, that is, the entire contents of all of the blocks.

Further, since the main routine of the control program for defining the operation of the electrical system apparatus is stored in one specified block constructed by a flash memory, the main routine can be easily rewritten and only the content of the specified block, that is, the main routine of the control program can be rewritten into a desired program supplied from the external device so that the rewriting operation can be easily effected in a short period of time.

If in the case the system apparatus contains both microcomputer including flash memory and microcomputer including ROM, it is easy to distinguish between flash memory and ROM by checking the version of memory means.

Therefore, the "derivative mode" (the application mode for repair and adjustment in which the function or specification of the software version different for each sales shop or for each destination of the electrical apparatus can be easily changed on the user side including the sales shop) can be easily coped with by rewriting the content of the specified block which is part of the flash memory area without rewriting the contents of all of the areas of the flash memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT (Embodiment)

There will now be described an electrical system apparatus according to an embodiment of this invention with reference to the accompanying drawings.

Figure 1:
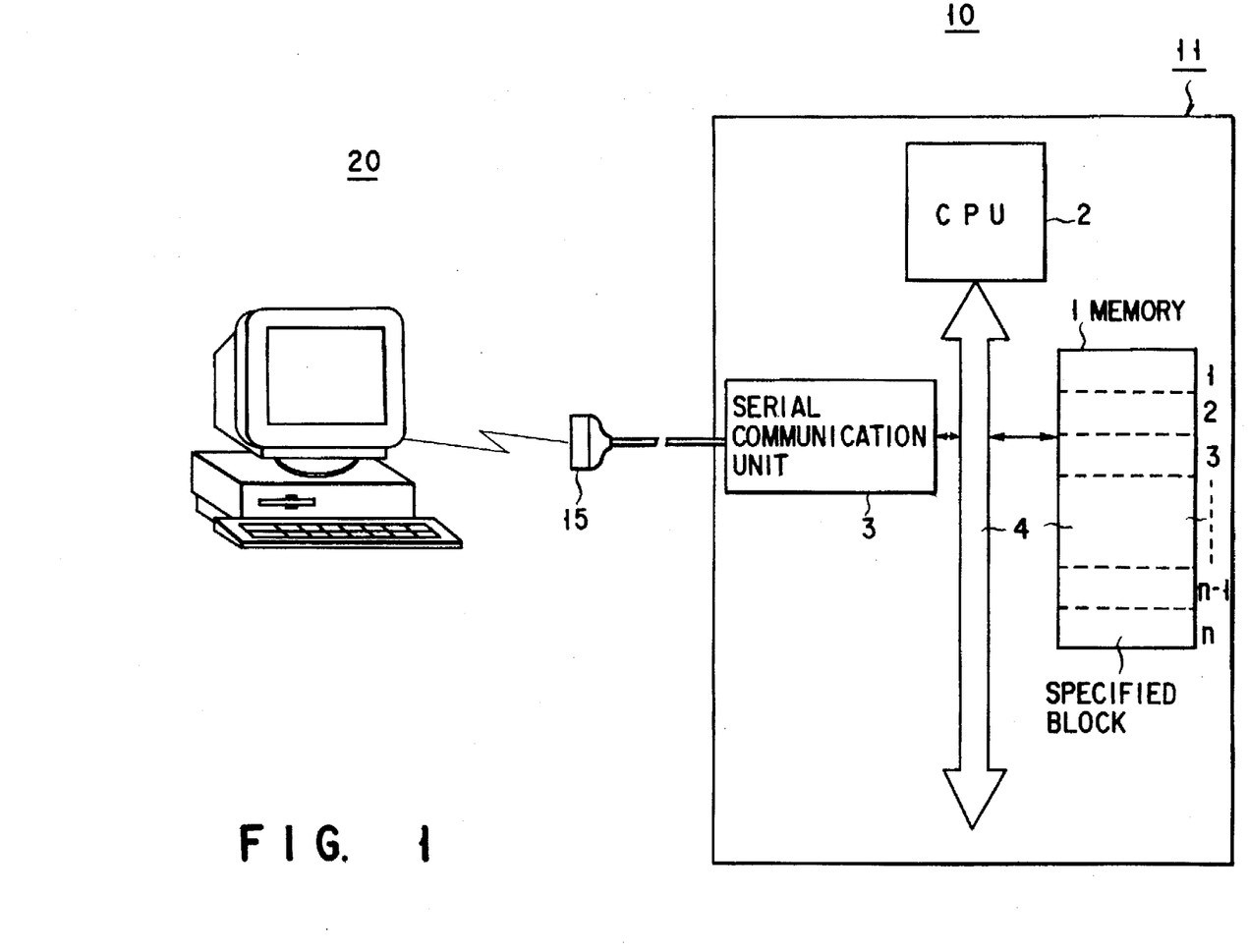
FIG. 1 is a construction diagram of the interconnection between an electrical system apparatus of this invention including a one-chip microcomputer and an external device.

In FIG. 1, the conception of the connecting relation between an electrical system apparatus 10 according to the embodiment of this invention and an external device 20 is shown. A one-chip microcomputer 11 contained in the main body of the electrical system apparatus 10 according to this invention is connected to the external rewriting device 20 provided outside the main body thereof via an external communication connector 15 of serial line as shown in FIG. 1. As one example of the external rewriting device 20, a personal computer having an external input/output communication function as shown in FIG. 1 may be used. Further, the external rewriting device 20 may be a writing device exclusively used for the system apparatus or a desired recording device having a function of the same degree as the writing device.

Further, the electrical system apparatus 10 may be connected to the external rewriting device 20 via a public communication line or by means of remote communication using a radio circuit.

As shown in FIG. 1, in the microcomputer 11 of one-chip type, memory means (for example, flash memory) 1, CPU (Central Processing Unit) 2 and serial communication unit 3 are accessibly connected via a bus 4. The CPU 2 effects the preset control operation for transmission and reception of signal data between the serial communication unit 3 and the memory 1 via the bus 4 and loads a preset program previously stored in the memory 1 into the main memory area (not shown) of the CPU 2 and effects the operation according to the program sequence.

The memory 1 is divided into a plurality of blocks 1 to n as indicated by broken lines shown in FIG. 1 and the content of each block can be erased or deleted and rewritten or overwritten. In the case of this example, particularly the block n is called a specified block and a program (which is hereinafter referred to as a "derivative program") in which the version of a function or specification different for each destination or sales shop or to or in which a device having the above memory, for example, an electronic device having a flash memory is shipped or sold can be freely changed is stored in the specified block. The specified block in FIG. 1 is set in the final block having the block number n, but the specified block is not necessarily set to correspond to the final block number n (n=N: n=1 to N) and it can be set to at least one of the blocks lying in a preset desired position.

When the derivative program is changed, the version of the software of the electrical system apparatus can be changed by receiving a program which is new data supplied from the external device 20 via the serial communication terminal 15 and overwriting the existing content of the specified block n.

Next, the practical case of the electrical system apparatus of this invention is explained by taking a camera which is an electrical device containing, for example, a microcomputer of one chip as an example.

Figure 2:
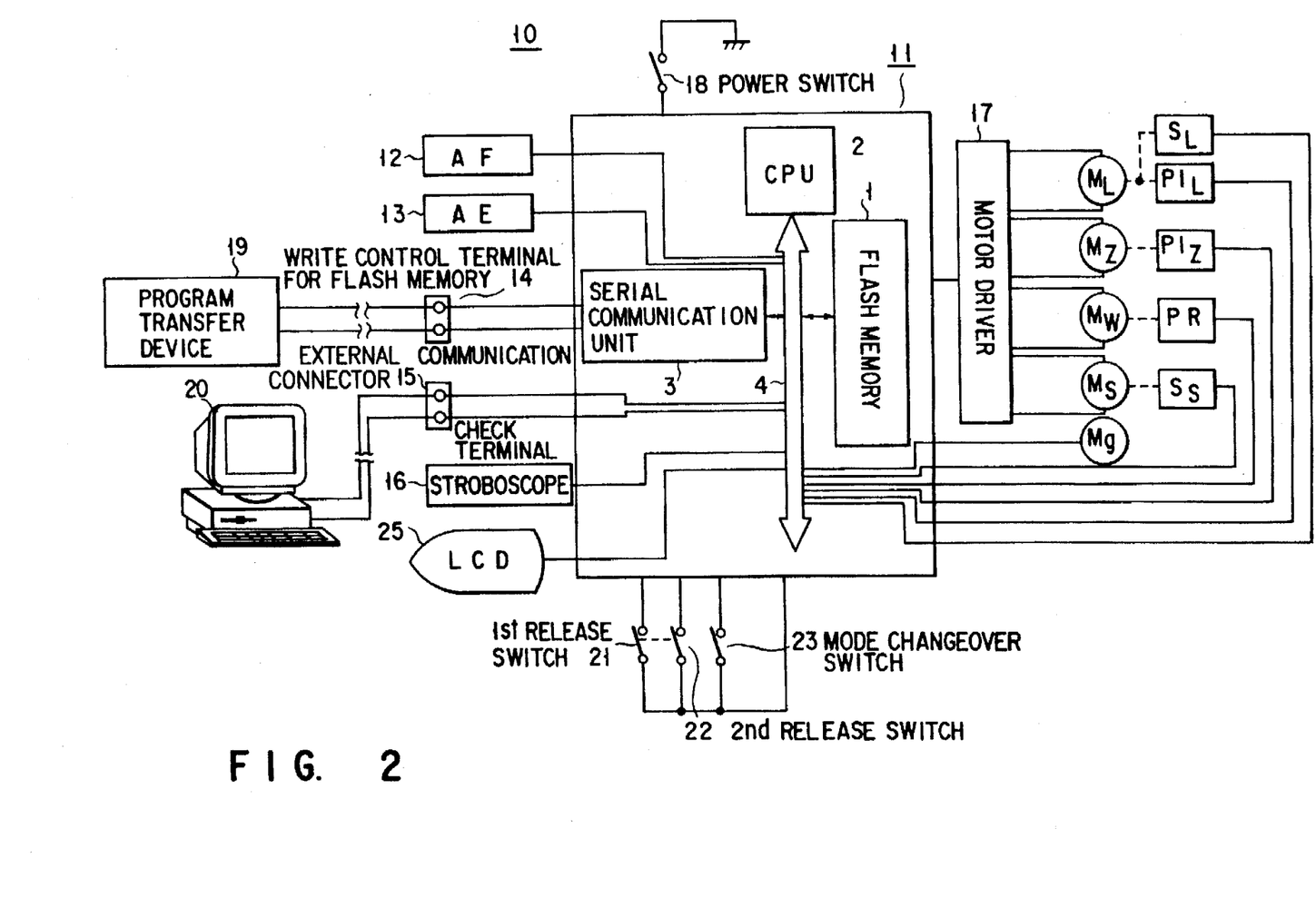
FIG. 2 is a functional block construction diagram showing the construction of a camera as the electrical system apparatus of this invention.

In FIG. 2, the basic construction of the camera body 10 to which the one-chip microcomputer 11 which is a feature of this invention is applied is shown in a block diagram. The one-chip microcomputer 11 for effecting a preset operation sequence of the camera and the control operation for a sequence of operations includes the rewritable flash memory 1 which is formed of a plurality of blocks as described before.

In the one-chip microcomputer 11, the CPU 2 and serial communication unit 3 are arranged as described before, and an AF circuit 12 for measuring the distance to a subject, an AE circuit 13 for measuring the brightness of the subject, a flash memory writing control terminal 14 for removably connecting a program transferring device 19 provided outside the camera body 10, an external communication connector 15 for removably connecting the personal computer 20 used as a device for writing data for ROM correction or adjustment for the camera body 10, and a stroboscope 16 for stroboscopic charging and light emission are further connected to the microcomputer 11 as shown in FIG. 2.

The flash memory writing control terminal 14 may include an "M terminal" and 12-V terminal, for example. Further, the flash memory writing control terminal 14 and the external communication connector 15 may be constructed by use of a single common connector.

In addition, as shown in FIG. 2, a motor ML for driving a focus lens, a motor Mz for driving a zoom lens, a motor Mw for taking up and rewinding a film, a motor Ms for driving a shutter, a magnet Mg for closing the shutter (that is, release) are connected to the one-chip microcomputer 11 via a motor driver 17 for driving various motors as shown in FIG. 2.

Further, a switch SL for detecting the initial position of the focus lens, a photo-interrupter PIL for detecting the unit driving amount (that is, shifting position) of the focus lens, a photo-interrupter PIz for detecting the position of the zoom lens, a photo-reflector PR for detecting the performance of the film, and a switch Ss for detecting the initial position of the shutter are connected to the one-chip microcomputer 11 and they are connected to the corresponding motors as shown in FIG. 2.

Further, various switches including a power switch 18, first (1st) release switch 21, second (2nd) release switch 22 are connected to the one-chip microcomputer 11. The first release switch 21 and the second release switch 22 construct a so-called "two-stage switch", and the first release switch 21 is turned ON at the first stage and the second release switch 22 is turned ON at the second stage. A mode changeover switch 23 is further provided as a switch for selectively setting the mode of the camera (camera mode).

In addition, an LCD 25 constructed by a liquid crystal image plane for displaying information such as the number of frames of the film and camera mode and a mark indicating the "derivative mode" which will be described later is connected to the one-chip microcomputer 11.

Figure 3:
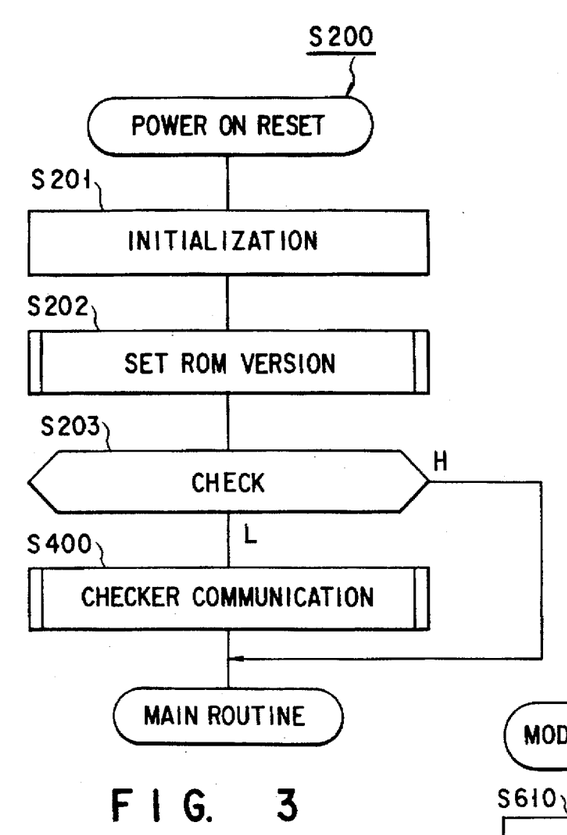
FIG. 3 is a flowchart illustrating the initial routine "Power-ON Reset" relating to the initial operation of the camera.

In FIG. 3, the flowchart of the routine "Power-ON Reset" for effecting the main initial operations of the camera is shown. The initial operations are explained also with reference to FIGS. 1 and 2.

If the power switch is turned ON or a battery (not shown) is set into the camera body 10 as a power source by the user when the product device is started to be used, a program "Power-ON Reset" (S200) stored in a portion other than the specified block (block n) in the memory of FIG. 1 is called and the board of the microcomputer 11 and other electrical elements are initialized (S201).

Next, the ROM version which is now installed is written into a specified RAM (S202).

Then, whether the type of the CHECK terminal is the high level "H" or low level "L" is checked (S203), and if it is determined to be at the low level "L", the subroutine "Checker Communication" to be described later is next effected (S400).

After completion of the above step, the process jumps or goes to the main routine (refer to S100 of FIG. 5) which will be described later and is stored in the specified block (block n) of the flash memory 1.

Figure 4:
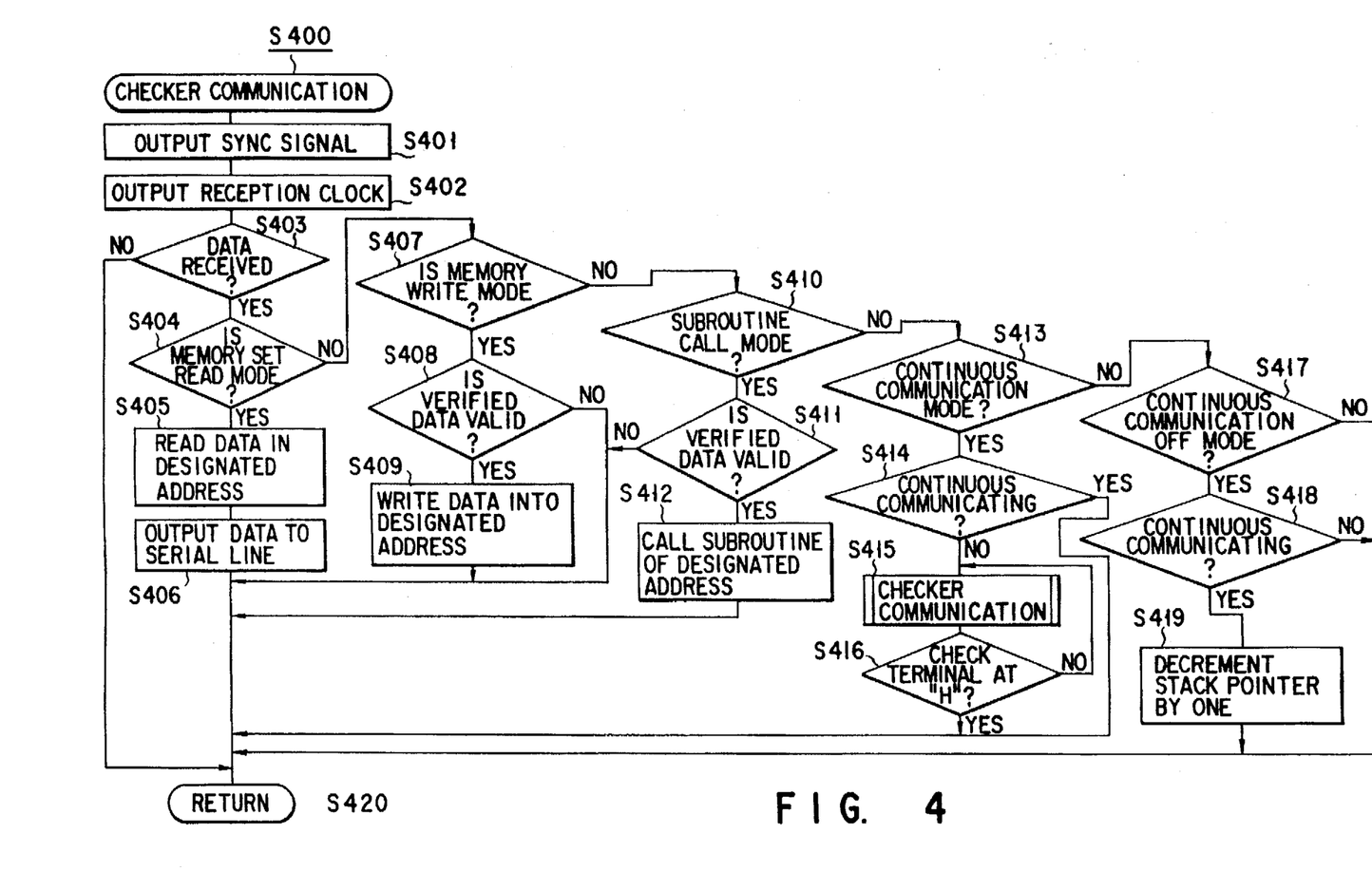
FIG. 4 is a flowchart illustrating the processing operation of the subroutine "Checker Communication" relating to communication.

FIG. 4 is a flowchart showing the operation of the subroutine "Checker Communication" (S400).

When a synchronizing signal and a clock signal for serial communication are output from the one-chip microcomputer 11 to the exterior of the system apparatus (S401, S402), data is received from the external device of the system apparatus (S403). At this time, if no received data is present, a sequence of processes is terminated and the process is returned to the step of "Power-ON Reset" which is the called initial routine.

However, if data is received, the operation mode of the memory is determined (S404), and if the operation mode is "Read Mode", the content of the received data is decoded and data in a designated address in the microcomputer 11 is read out (S405). After this, data is output via the serial cable (S406) and the process is returned to the step of "Power-ON Reset" which is the called initial routine (S420).

On the other hand, if the operation mode of the memory is "Write Mode" (S407), preset data to be verified is checked (S408). Then, if the result of the checking operation is satisfied, the data (for example, the program of execution format (for example, object code) for controlling the camera) is written into a preset designated address (for example, the top address of the specified block) (S409).

Further, if the operation mode is "Subroutine Call Mode" (S410), the verified data is checked (S408), and if the result of the checking operation is satisfied, a specified subroutine is called (S412) and the subroutine present in the designated address is executed.

If the operation mode is "Continuous Communication Mode" in which only communication with the exterior of the system apparatus is effected (S413), then whether the continuous communication mode is now actually set or not is determined (S414). If the continuous communication mode is not now actually set, the subroutine "Checker Communication" is executed again (S415) and the "Checker Communication" process is executed (S416) until the CHECK terminal is set to the "H" level.

When "OFF Mode" for interrupting the continuous communication is set (S417), whether the continuous communication mode is now actually set or not is determined (S418). If the continuous communication mode is not now actually set, the stack pointer indicating the present address is decremented by one (S419).

By utilizing the routine "Checker Communication" in each step, the "Specified Block Rewriting" program to be described later and the "Camera Adjusting Process" to be described later can be executed.

Figure 5:
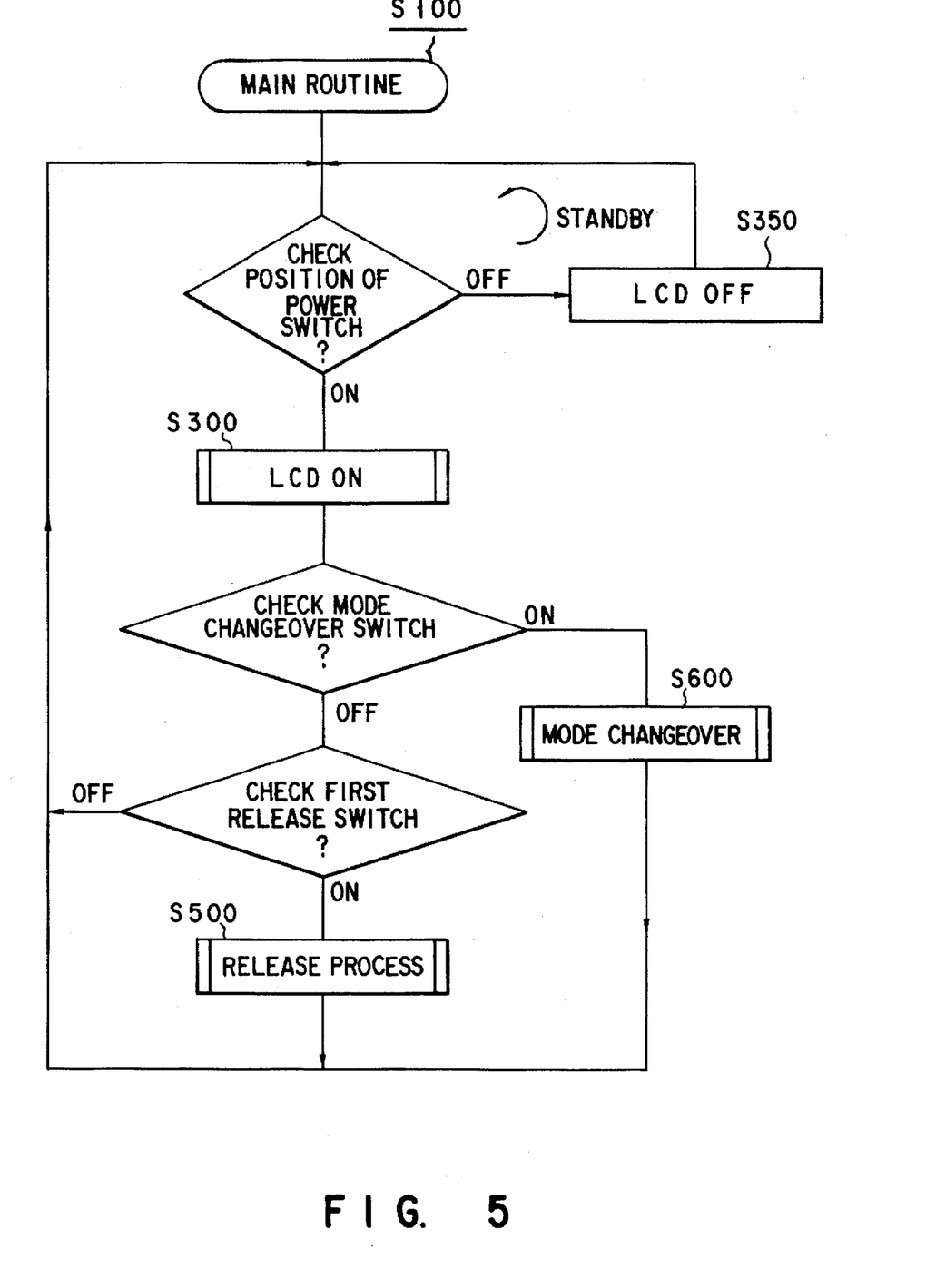
FIG. 5 is a flowchart showing the main routine for defining the main operation of the electrical system apparatus of the present invention.

The flowchart of FIG. 5 shows the main routine relating to the main operation of the camera which is the electrical system apparatus of this invention. First, whether the power switch is set in the ON or OFF position is checked, and if it is set in the OFF position, the LCD of the display is de-activated and the "Standby State" is set. The standby state is sustained until it is released by turn-ON of the power switch.

If the power switch is set into the ON position, the subroutine "LCD Turn-ON" display process is effected (S300). Then, the position of the mode changeover switch is checked. If the mode changeover switch is set in the ON position, the "Mode Changeover" process is effected (S600) and then the process is returned to the first step of the main routine S100.

On the other hand, if the mode changeover switch is set in the OFF position, the ON/OFF position of the first release switch is checked. If it is set in the ON position, the "Release Process" is effected (S500) and then the process is returned to the power switch checking step again. Also, if the first release switch is set in the OFF position, the process is returned to the power switch checking step.

Figure 6:
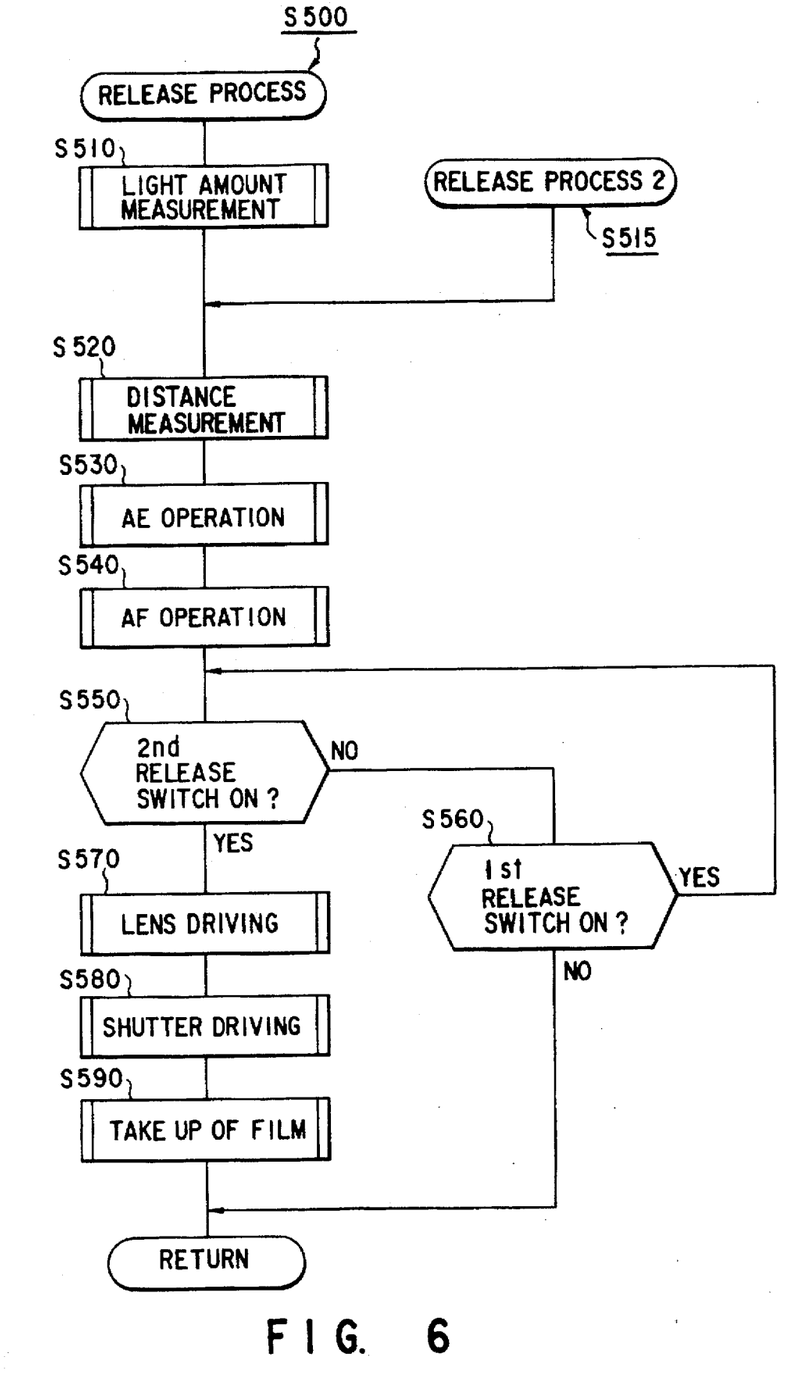
FIG. 6 is a flowchart showing the subroutine "Release Process" relating to the release operation of the camera.

The flowchart of FIG. 6 shows the operation of the subroutine "Release Process" S500. Next, the operation control of the subroutine executed by the camera body is explained.

When the subroutine program S500 is started, the "Light Amount Measuring" process for measuring the brightness of the subject is effected (S510) and then the "Distance Measuring" process for measuring the distance to the subject is effected (S520). In this case, the "Release Process 2" (S515) which is interruptible between the above processes is simply indicated by the label name indicating an address in order to utilize the so-called "Derivative Mode" to be described later.

Further, in the "AE Operation" routine, a correct light measurement value is derived by utilizing data in the flash memory for correcting a variation in the light measurement value of each camera based on the actual light amount measurement value (S530), and in the succeeding "AF Operation" routine, the driving amount of the focus lens is corrected to an adequate value for each camera by utilizing data in the flash memory for correcting a variation in the performance of each camera (S540).

Then, the position of the second release switch 22 is checked (S550), and if the switch is set in the OFF position, it is set in the standby state until the switch is turned ON. If the first release switch 21 is set into the ON position while the second release switch 22 is kept set in the OFF position, the process is terminated (S560). After this, if the second release switch 22 is set into the ON position, the focus lens is driven by the lens driving operation, the shutter is opened, the film takeup operation is effected (S570 to S590), and a sequence of processing operations is terminated and the process is returned to the main routine which has called the present routine.

Figure 7A:
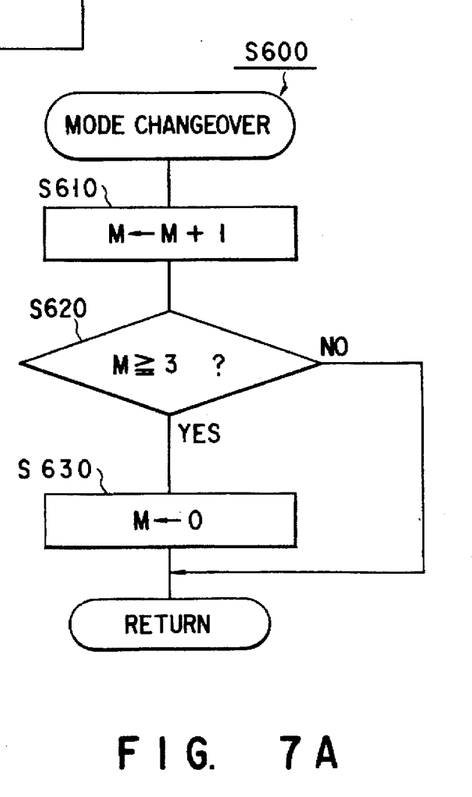
FIGS. 7A and 7B show the mode switching operation of the camera, FIG. 7A being a flowchart showing the subroutine "Mode Switching" and FIG. 7B being a table showing an example of the relation indicating table of the application mode of the camera.

The flowchart of FIG. 7A shows the subroutine "Mode Changeover" S600. First, a mode variable M is incremented by one (S610). The mode variable M is previously initialized to "0" immediately after the power-ON.

The value of the variable M is checked (S620). The values "0", "1", "2" of the variable M indicate the types of modes to be described later and are cyclically changed. Therefore, if the variable M is set to "3" or more, the variable M is initialized to "0" (S630) and then the process is returned to the main routine which has made a call.

Figure 7B:
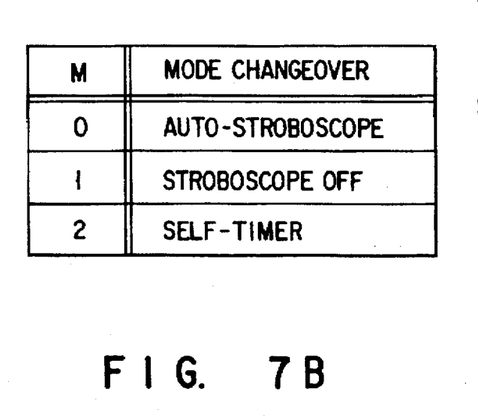

The table of FIG. 7B is a relation indicating table showing one example of the operation mode of the camera. In the case of camera, integral numbers "0" to "2" having three types of inherent meanings are assigned for the variable M indicating the mode. More specifically, M="0" indicates the "Automatic Stroboscope Mode" and indicates the low-brightness automatic light emission mode. Further, M="1" indicates the "Stroboscope OFF mode" and M="2" indicates the "Self-Timer Mode".

Further, another mode representing another function can be newly set depending on the type of the camera, and in this case, a new M value for the other function may be additionally provided in the table and the check logic in the step S620 may be changed.

Figure 8:
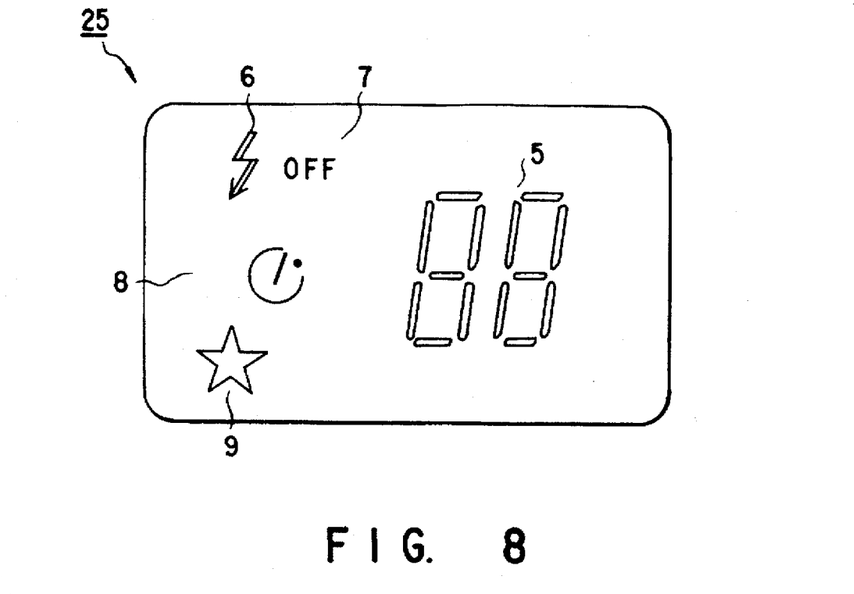
FIG. 8 shows the layout on the image plane showing an example of an LCD display plane.

In FIG. 8, one example of the layout of the LCD display image plane is shown. In the image plane 25, seven segments for frame number display, a zigzag mark 6 indicating the automatic stroboscope mode, an OFF mark indicating the stroboscope OFF mode, a timepiece mark 8 indicating the self-timer mode, and a star mark 9 indicating the "Derivative Mode" are displayed in the layout as shown in FIG. 8. However, the star mark 9 indicating the derivative mode is not displayed in the normal operation mode and indicates a mode as an option/function mode used only in the camera in which the derivative mode can be selectively set.

Figure 9:
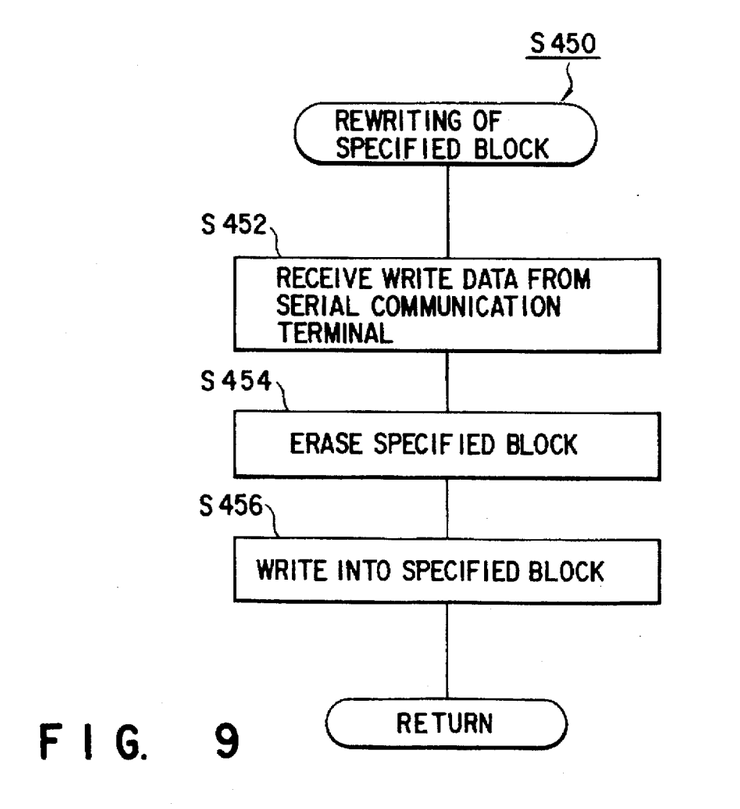
FIG. 9 is a flowchart showing the subroutine "Specified Block Rewriting"

FIG. 9 is a flowchart showing the subroutine "Specified Block Rewriting" S450. By utilizing the "Checker Communication" S400, the subroutine S450 can be executed. That is, by utilizing the function (S407 to S409) of writing data into an address designated in the write mode of the memory, the top address of the specified block rewriting subroutine is set. Next, the subroutine of "Specified Block Rewriting" is executed by utilizing the step S412 in the "Checker Communication". In this case, if execution of the subroutine is started, memory content rewriting data supplied from the exterior, that is, a program of execution format is first received from the serial communication terminal and temporarily stored into a RAM of the one-chip microcomputer, for example, input buffer (S452). Next, a specified block n of the flash memory which is desired to be rewritten in the one-chip microcomputer is designated, the content of the block n is erased (S454), the process for writing data temporarily stored in the RAM into the specified block is effected (S456), and then the process is returned to the main routine which has called the present routine.

Figure 10A:
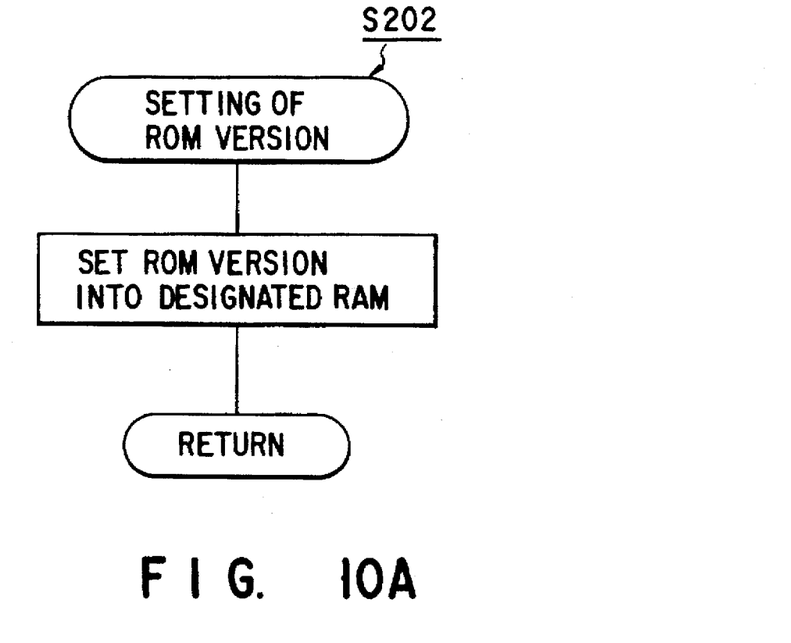
FIGS. 10A and 10B show the setting of ROM versions, FIG. 10A being a flowchart showing the subroutine "ROM Version Setting" and FIG. 10B being a table showing an example of the management table of the ROM version.

The flowchart of FIG. 10A indicates the subroutine "ROM Version Setting" S202. The routine mainly effects the process for writing a ROM version identifier described in the program in a preset format into a designated RAM address. By writing the ROM version identifier into the designated RAM address, it becomes possible to read out the identifier from the external device by use of the "Checker Communication" S400 in order to recognize the type of the version of the ROM in the later step.

Figure 10B:
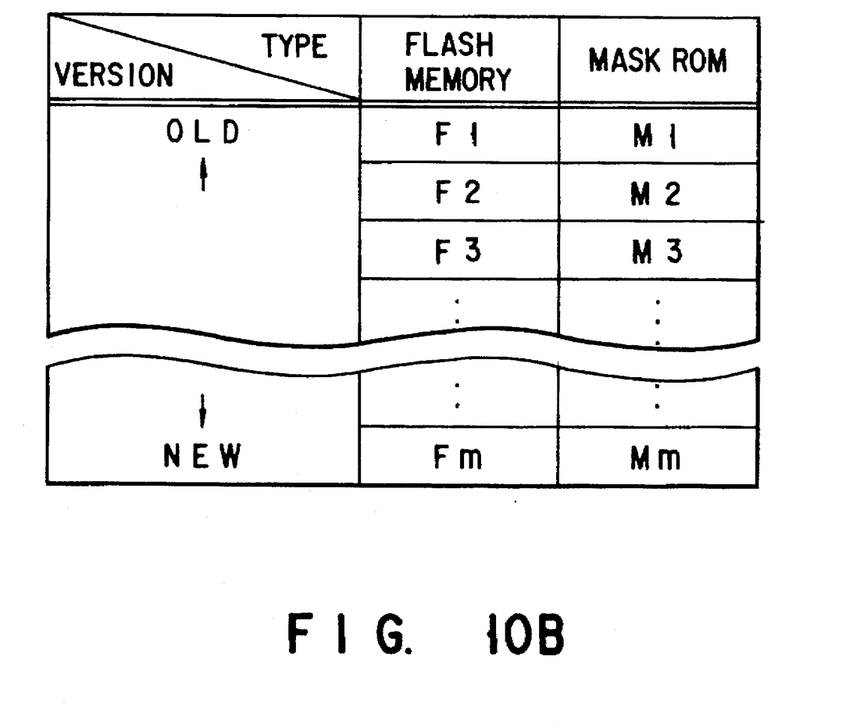

The table of FIG. 10B indicates one example of the management table of ROM version. The management table is a relation indicating table indicating the relation between new and old data items of the flash memory and the mask ROM, and F1, F2, - - - are written in this order and added in the ascending order, for example, each time the program version in the flash memory is changed. When the version identifier goes to a higher level, whether a block other than the specified block in the flash memory is corrected or not can be managed. As a result, if the version is checked in a repair shop in which the product device is repaired and adjusted, for example, the program of old version can be changed in a block other than the specified block, that is, the program can be updated.

Further, in a case where the electrical system apparatus manufactured when a relatively long time has passed after this type of electrical system apparatuses were first manufactured as electrical products is improved, it is considered to replace the microcomputer containing the flash memory by a one-chip microcomputer of mask ROM in the manufacturing process if it is understood that there occurs no problem even if the microcomputer of mask ROM is used. In such a case, since it is impossible to cope with the program change in the repair shop, it is necessary to determine the flash memory or mask ROM and identify the version thereof. Therefore, for example, M1, M2, - - - are used to indicate the ROM version in the case of ROM and thus different identifiers are used to distinguish the ROM from the flash memory. In this example, the derivative model is considered, and the program to be written into the specified block is set to the program such as the "Main Routine" (refer to FIG. 5), "Release Process" (refer to FIG. 6), or "Mode Changeover" (refer to FIG. 7). The other initial routines "Power-ON Reset" and "Specified Block Rewriting" and the like are stored into the blocks other than the specified block. Particularly, if the subroutine programs such as "Power-ON Reset" and "Specified Block Rewriting" are present in the specified block, there occurs a possibility that they may be erased at the time of rewriting of the program, and therefore, it is required for the above routines to be always provided in the block other than the specified block.

(Modification)

Next, a concrete example of the derivative mode other than the above-described derivative mode (for example, a mode in which the program of the specified block of the flash memory is rewritten and the function and specification are changed) is explained.

Figure 11:
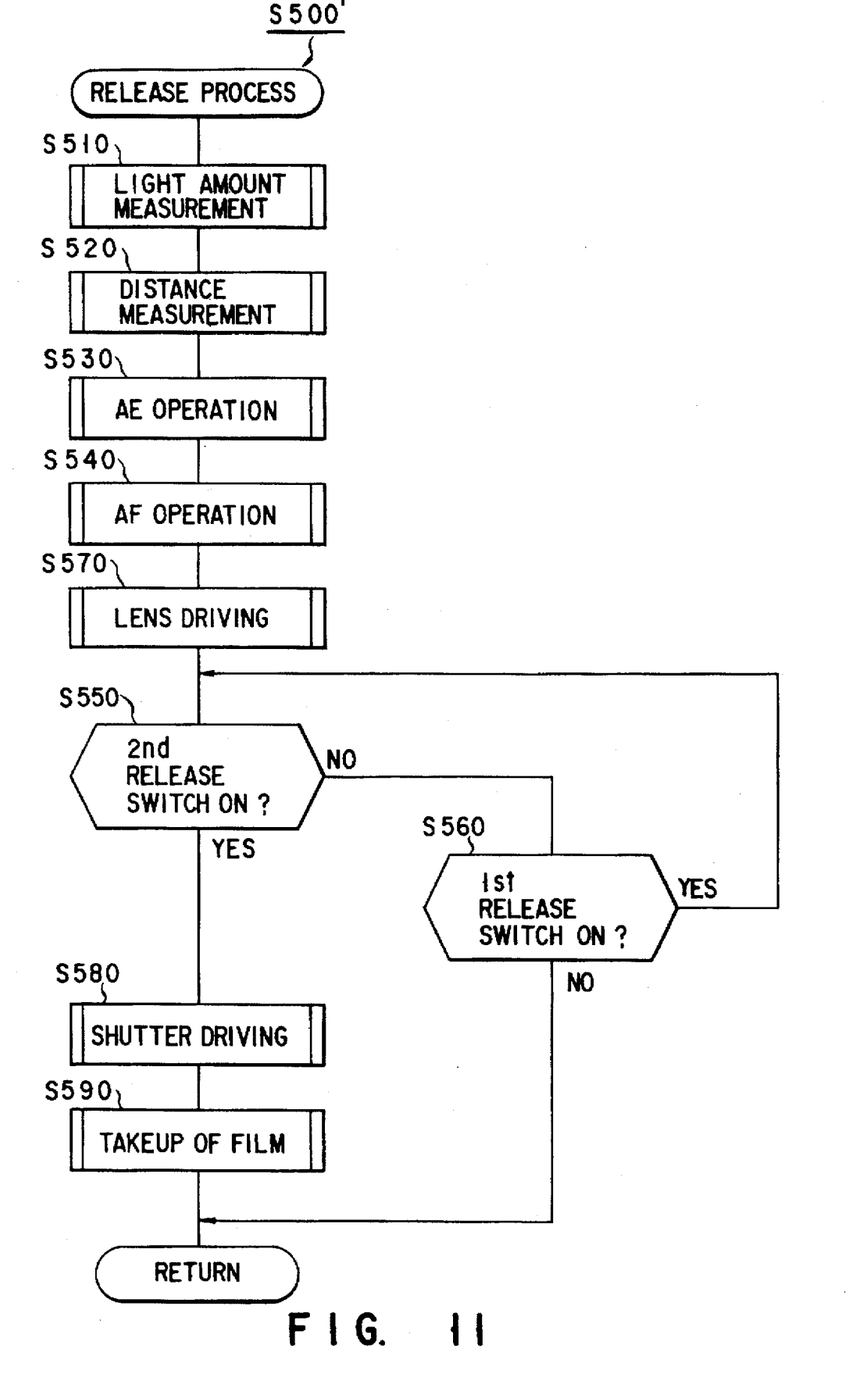
FIG. 11 is a flowchart showing another subroutine "Release Process" as an example of the modification of the derivative mode.

The flowchart of FIG. 11 shows the subroutine "Release Process" S500' as a modification of the derivative mode. This example is a modification in which part of the process is changed to effect the lens driving step S570 in the "Release Process" routine S500 of FIG. 6 as a step succeeding to the step S540 so as to drive the lens by the first release. The other processing steps are the same as those explained with reference to FIG. 6 and the detail explanation therefor is omitted.

Figure 12:
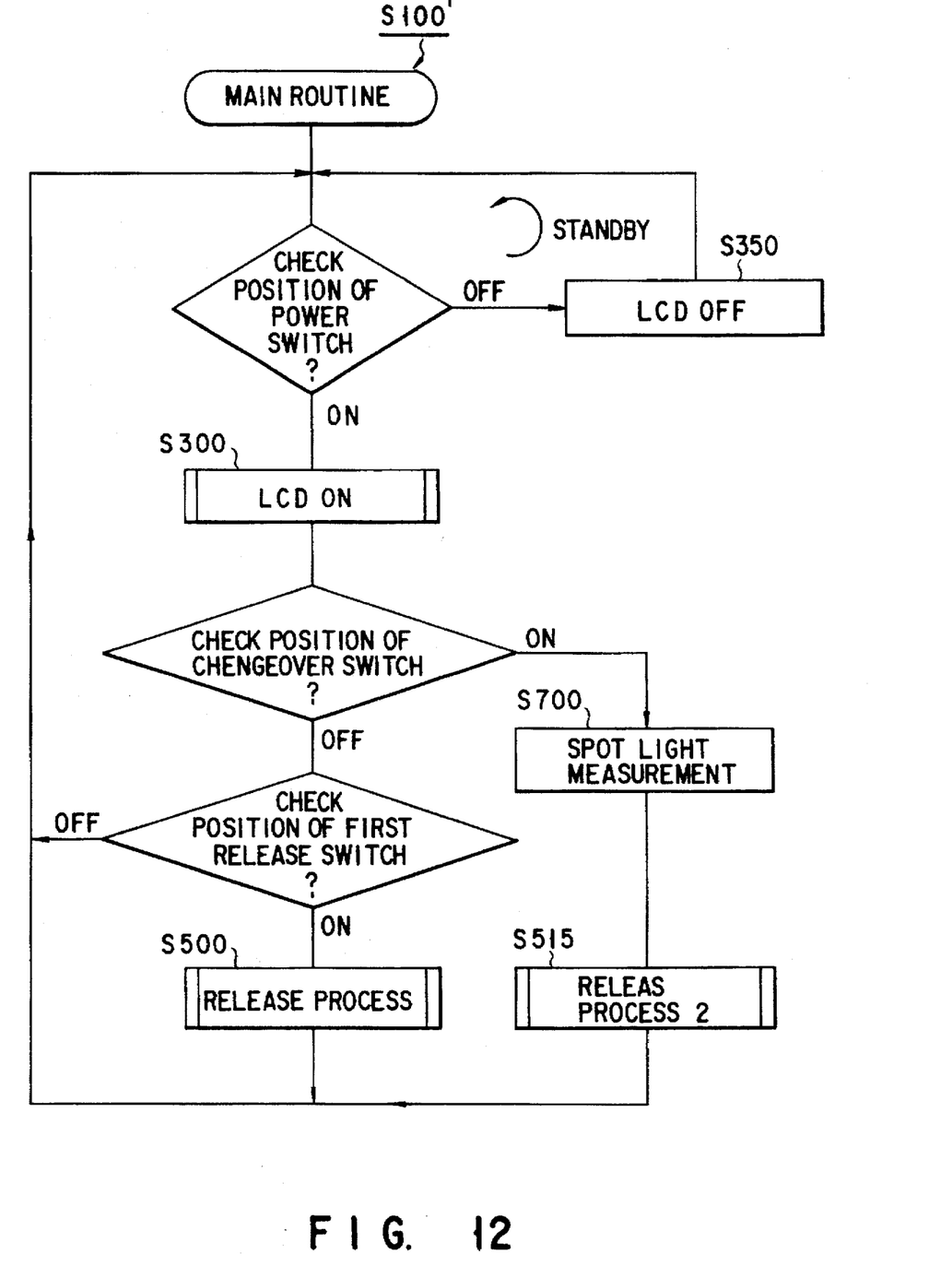
FIG. 12 is a flowchart showing another main routine as another example of the modification of the derivative mode.

The flowchart of FIG. 12 shows the main routine S100' as another modification of the derivative mode. More specifically, this example is a modification in which part of the process in the flowchart of the main routine S100 of FIG. 5 is changed to effect the "Spot Light Measurement" S700 instead of the mode changeover step S600. That is, when the mode changeover switch is set in the ON position, the spot light measurement step S700 is effected and then the release process 2 is called as the subroutine S515.

As described above, the change specification and addition of function of the electrical system apparatus can be extremely easily attained by setting and holding the main routine and the program corresponding to the main routine in the specified block.

Figure 13A:
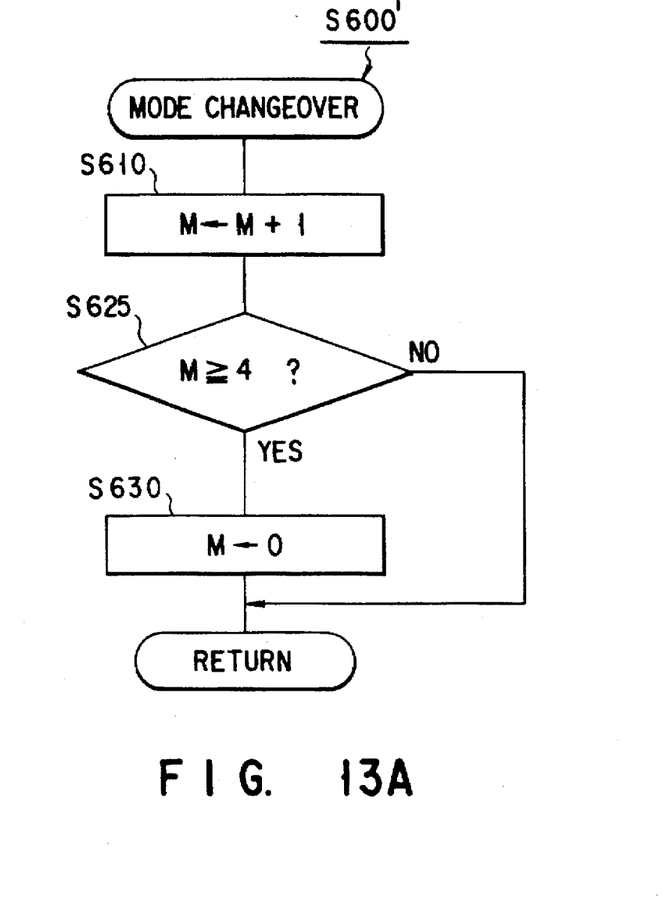
FIGS. 13A and 13B show the mode switching, FIG. 13A being a flowchart showing another subroutine "Mode Switching" and FIG. 13B being a table showing another example of the relation indicating table of the application mode of the camera.
Figure 13B:
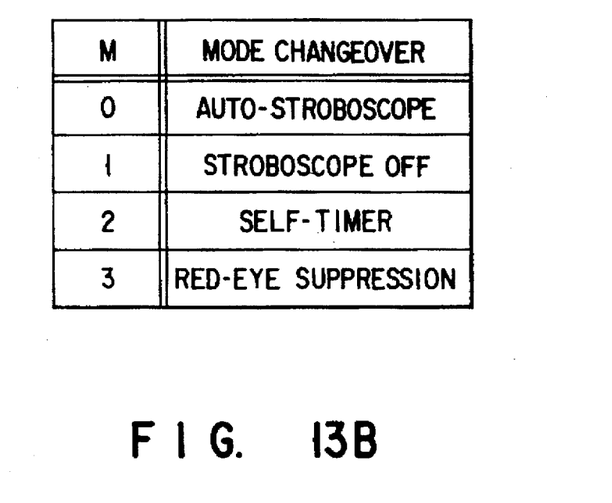

FIGS. 13A and 13B show a modification of the derivative mode in which one mode is added to the mode changeover process of FIGS. 7A and 7B. That is, in the case of added mode of M=3, the program can be changed so as to light the star mark of the LCD and add a function of "Red-Eye Suppressing Mode (more specifically, a mode in which the stroboscope is previously activated before photographing to contract the pupils of the subject)".

Thus, by setting the routine in which the program may be changed in the specified block, the maintenance after the shipment, for example, the repair, adjustment and addition of function can be easily and rapidly attained on the user side. However, if the main routine is present in the specified block, any change in the system apparatus can be flexibly coped with by changing the label (address) of the "Mode Changeover" of the main routine to a different label of "Mode Changeover B", for example, setting the "Mode Changeover B" in the table of FIG. 13B and writing the same into the specified block.

(Other Modifications)

The apparatus relating to this invention is not limited to the above embodiment and modifications and can be variously modified without departing from the technical scope of this invention.

In summary, the one-chip electrical system apparatus including a one-chip microcomputer relating to this invention is embodied as follows, effects the following operation and has the following effects.

(1) The electrical system apparatus including the one-chip microcomputer of this invention is an electrical system apparatus containing memory means divided into a plurality of blocks; comprises at least one specified block set in a preset block of the memory means, for storing the procedure for realizing a preset function or specification of the system apparatus as a program; a specified block rewriting program stored in at least one of the blocks other than the specified block, for rewriting the content of the specified block; and serial communication means accessibly connected to the memory means and having a preset serial communication function; and is characterized in that the specified block rewriting program causes data received by the serial communication means to be written into the specified block.

Operation/Effect 1: Since the built-in rewritable memory is divided into a plurality of blocks and the specified block rewriting program for rewriting the content of the specified block among the above blocks is stored in the other block, the adjustment, repair and change of the electrical system apparatus can be easily attained by receiving data containing a program transmitted from the external device via the serial communication means and rewriting the data according to the rewriting program without rewriting all of the contents of the entire area of the memory.

(2) In the above electrical system apparatus, the memory means is a rewritable flash memory and the specified block stores a main routine portion of the control program for defining the function or specification of the electrical system apparatus.

Operation/Effect 2: Since the main routine of the control program for defining the operation of the electrical system apparatus is stored in one specified block formed of a flash memory, it can be rewritten and only the content of the specified block, that is, only the main routine of the control program can be rewritten into desired data supplied from the external device, and as a result, the operation can be effected in a short period of time.

(Effect of this invention)

As described above, the following effect can be attained according to the construction of the electrical system apparatus including the one-chip microcomputer of this invention.

Since the built-in rewritable memory, for example, a flash memory is divided into a plurality of blocks and the specified block rewriting program for rewriting the content of the preset specified block among the above blocks is stored in the other block, it becomes unnecessary to rewrite all of the contents of the entire area of the flash memory by rewriting data containing a program transmitted from the external device according to the rewriting program.

For example, if the main program routine for controlling the operation of the electrical system apparatus is stored in the specified block, a change to a new version having a new operation function can be made simply by changing a desired step of the main routine in the specified block. That is, in the electrical system apparatus with the above construction, since the above-described rewriting method can be used, any adjustment, repair and change for the operation function caused after the sale can be easily coped with by application of the derivative mode.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electrical system comprising:
   a one-chip microcomputer having memory means including a plurality of blocks, each of the plurality of blocks storing one of a control program and data, said memory means having at least one specified block for storing a main routine of the control program for controlling a function or specification of the electrical system;
   communication means electrically coupled to said memory means, for communicating with an external device of the electrical system;
   writing means for writing one of data and a program received from said communication means into said specified block of said memory means;
   wherein said memory means stores a specified block rewriting program in at least one of said plurality of blocks different from said at least one specified block to rewrite the main routine of the control program stored in said at least one specified block.

2. An electrical system according to claim 1, wherein said memory means comprises a flash memory.

3. An electrical system according to claim 1, wherein the main routine stored in said specified block is executed after a routine for effecting serial communication and a power-ON reset process stored in a block different from said at least one specified block is executed.

4. An electrical system according to claim 1, wherein said memory means contains an identifier code indicative of a stored version, and said writing means writes data or program into said specified block according to the stored version.

5. An electrical system according to claim 4, wherein the stored version of said one-chip microcomputer is stored in a memory block different from said at least one specified block.

6. An electrical system according to claim 4, wherein the stored version of said one-chip microcomputer contains data indicating the type of ROM or electrically rewritable non-volatile memory.

7. An electrical system, comprising:
   a one-chip microcomputer having memory means including a plurality of blocks, each of the plurality of blocks storing one of a control program and data, said memory means having at least one specified block for storing a program for realizing a preset function or specification of the electrical system; and
   communication means electrically coupled to said specified block of said memory means, for communicating with an external device of the electrical system; and
   write inhibition means for receiving data or program via said communication means, for inhibiting the data or the program from being written into a block other than said specified block when the data or the program is written in said memory means.

8. An electrical system according to claim 7, wherein said communication means effects communication between an adjustment device and the electrical system and effects communication of a program for realizing the preset function or specification at the time of communication between the adjustment device and the electrical system.

9. An electrical system according to claim 7, wherein the electrical system comprises a camera and the preset function or specification is changed by rewriting the content of said specified block.

10. An electrical system according to claim 7, wherein said memory means comprises a flash memory.

11. A camera system comprising:
   a one-chip microcomputer having memory means including a plurality of blocks, each of the plurality of blocks storing a control program or data, said memory means having at least one specified block for storing a program for realizing a preset function or specification of the camera;
   communication means electrically coupled to said memory means, for communicating with an external device of the camera system;
   writing means for writing one of data and program received via said communication means into said specified block of said memory means;
   wherein said specified block stores a main routine of a control program for controlling the function or specification of said camera system; and
   wherein said memory means stores a specified block rewriting program in at least one of said blocks different from said specified block to rewrite the main routine of a control program of said specified block.

12. A camera system including according to claim 11, wherein said memory means comprises a flash memory.

13. A camera system according to claim 11, wherein said communication means effects communication between an adjustment device and the electrical system and inhibits the writing operation into a block other than said specified block of said memory means at the time of communication between the external device and the camera system.

14. A camera system according to claim 11, wherein the preset function or specification changes the display order of modes to be displayed by the camera system.

15. A camera system according to claim 11, wherein the preset function or specification changes the order of operations to be effected by the camera system.

16. A camera system according to claim 15, wherein the function or specification is set to change the timing of focusing of a photographing lens.

17. A camera system according to claim 11, wherein a new operation mode can be added in said specified block.

* * * * *